(12) United States Patent
Liu (10) Patent No.: US 10,976,603 B2
(45) Date of Patent: Apr. 13, 2021

(54) BACKLIGHT MODULE AND DISPLAY MODULE

(71) Applicant: Xiamen Tianma Micro-Electronics Co., Ltd., Xiamen (CN)

(72) Inventor: Bingping Liu, Xiamen (CN)

(73) Assignee: XIAMEN TIANMA MICRO-ELECTRONICS CO., LTD., Xiamen (CN)

( * ) Notice: Subject to any disclaimer, the term of this patent is extended or adjusted under 35 U.S.C. 154(b) by 0 days.

(21) Appl. No.: 16/552,064

(22) Filed: Aug. 27, 2019

(65) Prior Publication Data

US 2020/0096822 A1 Mar. 26, 2020

(30) Foreign Application Priority Data

Sep. 20, 2018 (CN) .......................... 201811099326.9

(51) Int. Cl.
*G02F 1/13357* (2006.01)
*G02F 1/1335* (2006.01)
*G02F 1/1362* (2006.01)
*G02F 1/1368* (2006.01)

(52) U.S. Cl.
CPC .. *G02F 1/133606* (2013.01); *G02F 1/133512* (2013.01); *G02F 1/133514* (2013.01); *G02F 1/1368* (2013.01); *G02F 1/136286* (2013.01); *G02F 2001/133613* (2013.01); *G02F 2001/133614* (2013.01)

(58) Field of Classification Search
CPC ......... G02F 1/133606; G02F 1/133509; G02F 2001/133613; G02F 2001/133614
See application file for complete search history.

(56) References Cited

U.S. PATENT DOCUMENTS

| 2006/0087827 | A1* | 4/2006 | Jung, II | G02F 1/133603 |
| | | | | 362/23.18 |
| 2008/0088570 | A1* | 4/2008 | Chang | G02F 1/133603 |
| | | | | 345/102 |
| 2009/0040423 | A1* | 2/2009 | Bae | G02F 1/133606 |
| | | | | 349/62 |
| 2009/0267794 | A1* | 10/2009 | Chang | G09F 9/33 |
| | | | | 340/907 |
| 2015/0357315 | A1* | 12/2015 | Oraw | G09G 3/32 |
| | | | | 315/294 |

(Continued)

FOREIGN PATENT DOCUMENTS

| CN | 101601079 A | 12/2009 |
| CN | 206557511 U | 10/2017 |

*Primary Examiner* — Julie A Bannan
(74) *Attorney, Agent, or Firm* — Anova Law Group PLLC (57) ABSTRACT

The present disclosure provides a backlight module and a display module. The backlight module includes a plurality of light-emitting units arranged in an array. Each light-emitting unit includes a first light-emitting structure, a second light-emitting structure, and a third light-emitting structure. The first light-emitting structure, the second light-emitting structure, and the third light-emitting structure are respectively disposed on at least two substrates that are arranged opposite to each other. Light emitted by the first light-emitting structure, light emitted by the second light-emitting structure, and light emitted by the third light-emitting structure are unoverlapped with each other.

16 Claims, 9 Drawing Sheets

(56) References Cited

U.S. PATENT DOCUMENTS

| | | | |
|---|---|---|---|
| 2016/0252231 A1* | 9/2016 | Fujikawa | G02F 1/133603 |
| | | | 362/235 |
| 2018/0088401 A1* | 3/2018 | Lin | G02F 1/23 |
| 2019/0094619 A1* | 3/2019 | Park | H01L 25/0753 |
| 2019/0245006 A1* | 8/2019 | Tsai | H01L 33/507 |

* cited by examiner

BACKLIGHT MODULE AND DISPLAY MODULE

CROSS-REFERENCES TO RELATED APPLICATIONS

This application claims the priority of Chinese patent application No. 201811099326.9, filed on Sep. 20, 2018, the entirety of which is incorporated herein by reference.

FIELD OF THE DISCLOSURE

The present disclosure generally relates to the field of display technology and, more particularly, relates to a backlight module and a display module.

BACKGROUND

A backlight is an important component of a passive light-emitting display module (such as a liquid crystal display module), and is used to provide a light source to assist a passive light-emitting element to implement the display function.

A conventional backlight module is used to emit white light. In order to display a specific color, the white light emitted by the backlight module passes through a color resist disposed on an opposite substrate, such that a color light can be formed and transmitted out. Therefore, such a backlight module needs to be used with a color resist for display. However, the thickness of the color resist is limited to 2.5 mm or less under the current level of the manufacturing process, which results in poor color gamut and chromaticity parameters of the display module.

In order to improve the color gamut and the chromaticity parameters, a backlight module, in which an array of light-emitting structures is disposed directly on the substrate to realize the emission of color light, has been developed. However, because the pitch between light-emitting structures that are arranged in an array needs to be set small, and the arrangement of the plurality of small-pitch light-emitting structures is difficult, the manufacturing yield of the backlight module is undesired.

The disclosed backlight module and display module are directed to solve one or more problems set forth above and other problems in the art.

BRIEF SUMMARY OF THE DISCLOSURE

One aspect of the present disclosure provides a backlight module. The backlight module includes a plurality of light-emitting units arranged in an array. Each light-emitting unit includes a first light-emitting structure, a second light-emitting structure, and a third light-emitting structure. The first light-emitting structure, the second light-emitting structure, and the third light-emitting structure are respectively disposed on at least two substrates that are arranged opposite to each other. Light emitted by the first light-emitting structure, light emitted by the second light-emitting structure, and light emitted by the third light-emitting structure are unoverlapped with each other.

Another aspect of the present disclosure provides a display module. The display module includes a display panel and a backlight module opposite to the display panel. The display panel includes an array substrate and a counter substrate arranged opposite to the array substrate, and the array substrate is located between the counter substrate and the backlight module. The backlight module includes a plurality of light-emitting units arranged in an array. Each light-emitting unit includes a first light-emitting structure, a second light-emitting structure, and a third light-emitting structure. The first light-emitting structure, the second light-emitting structure, and the third light-emitting structure are respectively disposed on at least two substrates that are arranged opposite to each other. Light emitted by the first light-emitting structure, light emitted by the second light-emitting structure, and light emitted by the third light-emitting structure are unoverlapped with each other.

Other aspects of the present disclosure can be understood by those skilled in the art in light of the description, the claims, and the drawings of the present disclosure.

BRIEF DESCRIPTION OF THE DRAWINGS

The following drawings are merely examples for illustrative purposes according to various disclosed embodiments and are not intended to limit the scope of the present disclosure.

DETAILED DESCRIPTION

Various exemplary embodiments of the present disclosure will now be described in detail with reference to the accompanying drawings. It should be noted that the relative arrangement of the components and steps, numerical expressions and numerical values set forth in the embodiments are not intended to limit the scope of the present disclosure. The following description of the at least one exemplary embodiment is merely illustrative, and by no means can be considered as limitations for the application or use of the present disclosure.

It should be noted that techniques, methods, and apparatuses known to those of ordinary skill in the relevant art may not be discussed in detail, but where appropriate, the techniques, methods, and apparatuses should be considered as part of the specification.

In all of the examples shown and discussed herein, any specific values should be considered as illustrative only and not as a limitation. Therefore, other examples of exemplary embodiments may have different values.

It should be noted that similar reference numbers and letters indicate similar items in subsequent figures, and therefore, once an item is defined in a figure, it is not required to be further discussed or defined in the subsequent figures.

Figure 1:
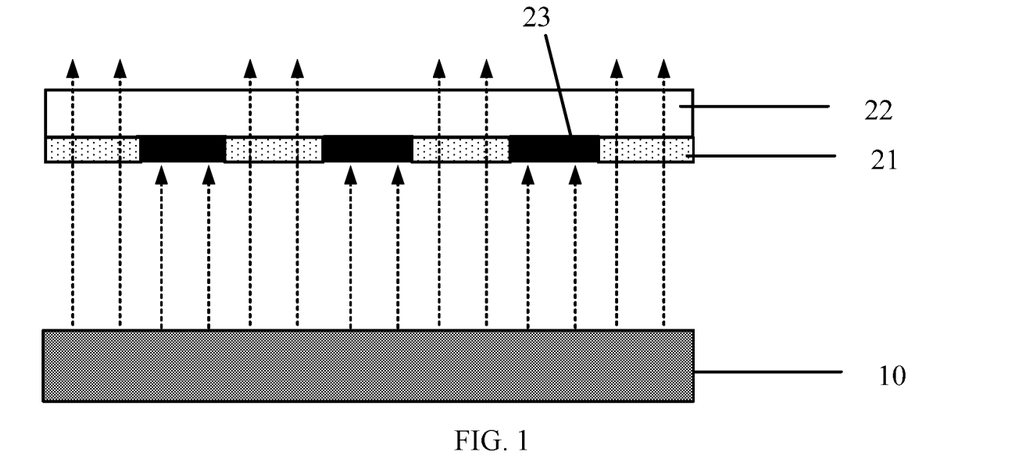
FIG. 1 illustrates a schematic cross-sectional view of a backlight module.

FIG. 1 illustrates a schematic cross-sectional view of a backlight module. Referring to FIG. 1, a conventional backlight module 10 is used to emit white light. The white light emitted by the backlight module 10 passes through a color resist 21 that is disposed on an opposite substrate, and then forms a color light. The color light is further transmitted out to realize the display of a certain color. However, the backlight module 10 needs to be used with the color resist 21 for color display, and the thickness of the color resist 21 is limited to 2.5 mm mm or less under the current level of the manufacturing process. Therefore, the color gamut and the chromaticity parameters of the display module may be undesired.

Figure 2:
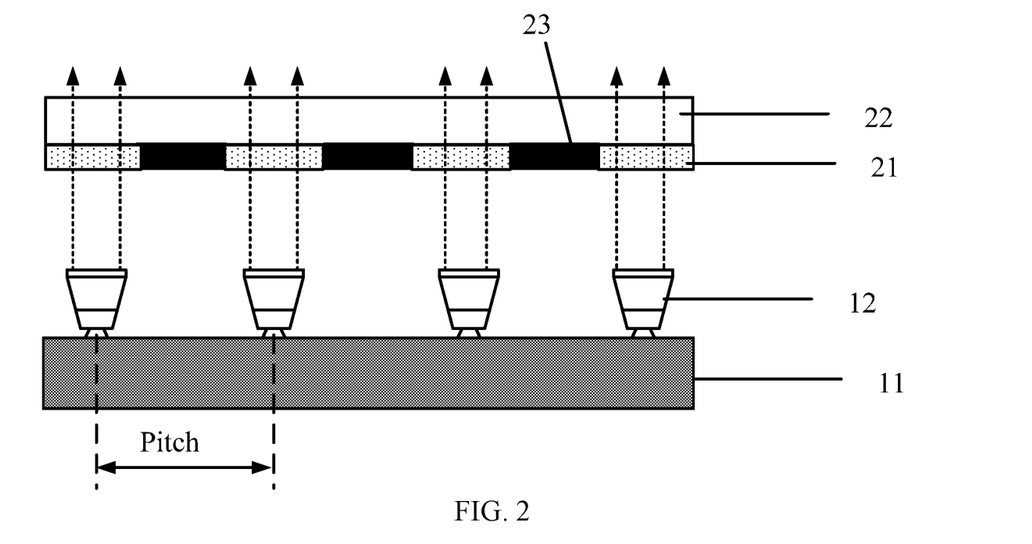
FIG. 2 illustrates a schematic cross-sectional view of another backlight module.

In order to improve the color gamut and the chromaticity parameters, a backlight module in which an array of light-emitting structures is disposed directly on the substrate to realize the emission of color light has been developed. FIG. 2 illustrates a schematic cross-sectional view of another backlight module. Referring to FIG. 2, in the backlight module, a plurality of light-emitting structures 12 arranged in an array is disposed on the substrate 11 for color display. However, because the pitch between light-emitting structures 12 that are arranged in an array needs to be set small, and the arrangement of the plurality of small-pitch light-emitting structures is difficult, the manufacturing yield of the backlight module is undesired.

Figure 3:
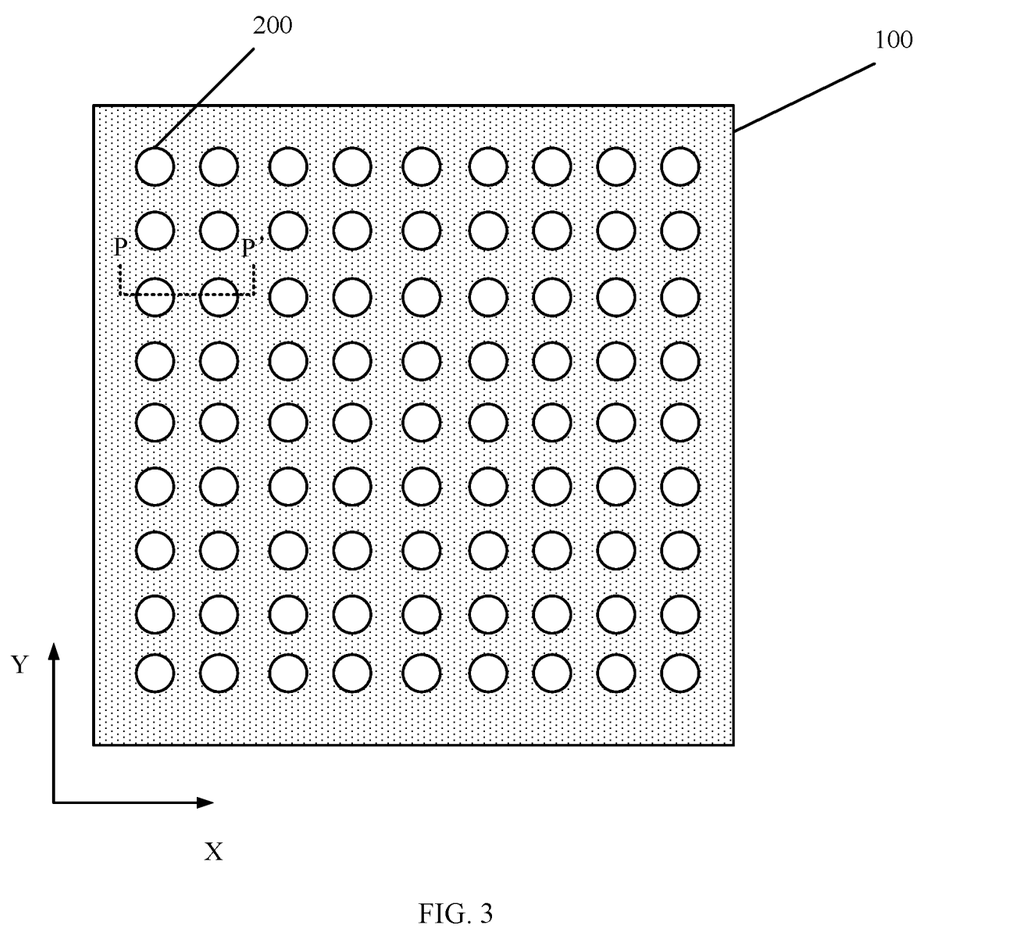
FIG. 3 illustrates a schematic top view of an exemplary backlight module according to various embodiments of the present disclosure.
Figure 4:
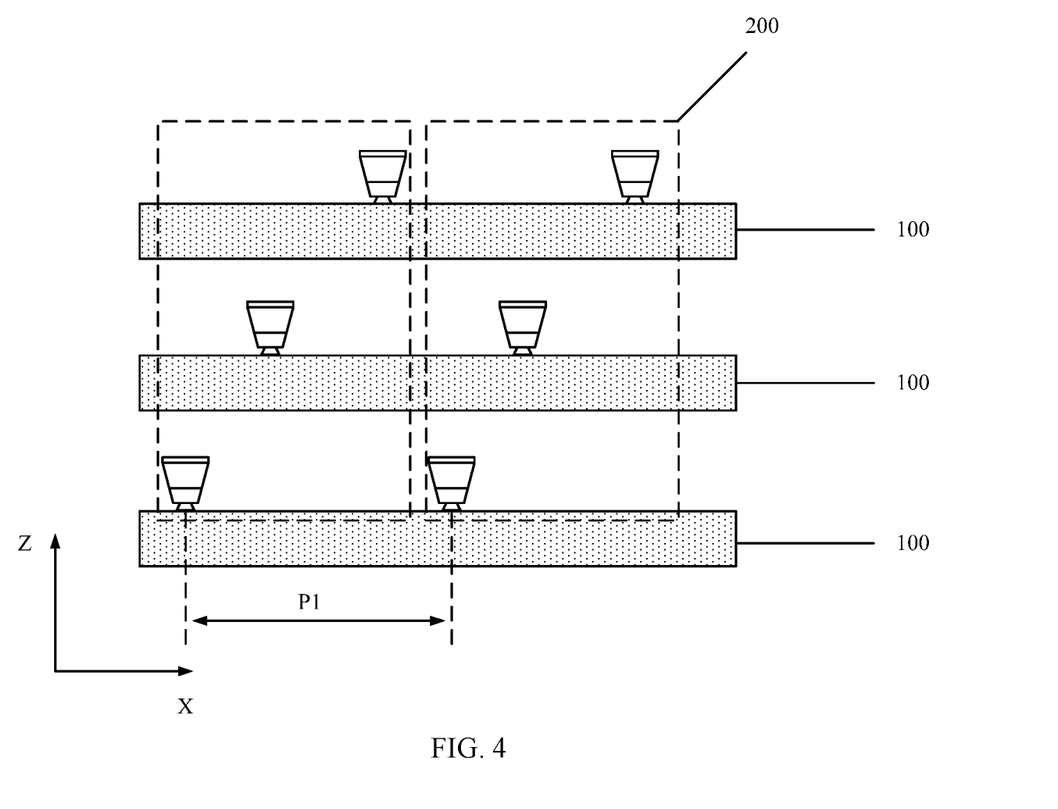
FIGS. 4-11 illustrate schematic cross-sectional views of the backlight module shown in FIG. 3 along a PP' line.
Figure 5:
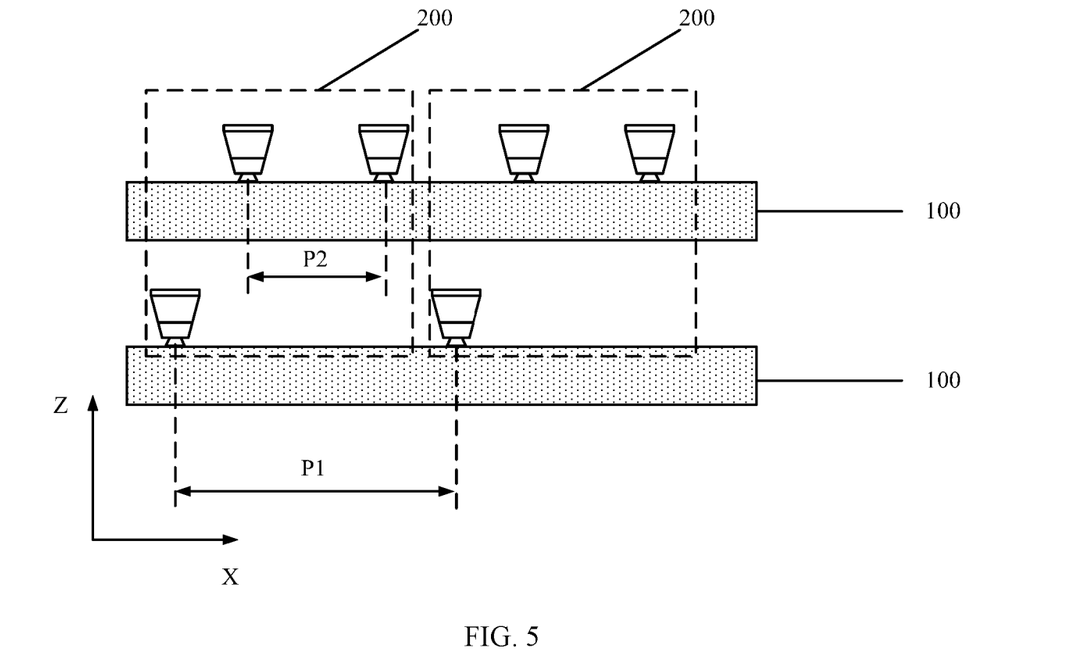

The present disclosure provides a backlight module. FIG. 3 illustrates a schematic top view of an exemplary backlight module according to various embodiments of the present disclosure, and FIGS. 4-5 illustrate schematic cross-sectional views of the backlight module shown in FIG. 3 along a PP' line. Referring to FIGS. 3-5, the backlight module may include a plurality of light-emitting units 200 arranged in an array. The backlight module may include a plurality of first light-emitting structures, a plurality of second light-emitting structures, and a plurality of third light-emitting structures. For example, each light-emitting unit 200 may include a first light-emitting structure, a second light-emitting structure, and a third light-emitting structure.

Further, in each light-emitting unit 200, the first light-emitting structure, the second light-emitting structure, and the third light-emitting structure may be respectively disposed on at least two substrates 100 that are arranged opposite to each other. In addition, the light emitted by the first light-emitting structure, the second light-emitting structure, and the third light-emitting structure may not overlap each other. The coordinate system in FIGS. 3-5 is a right-hand coordinate system established by taking a direction perpendicular to the light-emitting surface of the backlight module and points to the light-emitting direction as the positive direction of the Z-axis. For example, in a backlight module shown in FIG. 4, the plurality of first light-emitting structures, the plurality of second light-emitting structures, and the plurality of third light-emitting structures may be respectively disposed on three different substrates 100. In a case where the length of each of the light-emitting units is constant in the X direction, the pitch between adjacent light-emitting structures on a same substrate in the backlight module shown in FIG. 4 may be equal to the length P1 of the light-emitting unit 200 in the X direction. Compared with the backlight module according to existing technology, the pitch between adjacent light-emitting structures on the same substrate 100 is increased by three times, thereby reducing the difficulty of setting (bonging) the light-emitting structures on the substrate 100. As such, the yield of the backlight module may be improved, and the cost of the backlight module may be reduced.

In the backlight module shown in FIG. 5, each light-emitting unit 200 may include a light-emitting structure disposed individually on one substrate 100. That is, each light-emitting unit 200 may include only one light-emitting structure disposed on one of the at least two substrates 100. Therefore, the pitch between adjacent light-emitting structures on the substrate 100 may be equal to the length P1 of each light-emitting unit 200 in the X direction. Because two light-emitting structures may be disposed on another substrate 100 of a same light-emitting unit 200, the pitch P2 between the two light-emitting structures may be larger than or equal to one third of P1. Therefore, in the backlight module shown in FIG. 5, the pitch between adjacent light-emitting units 200 on the same substrate may also be increased to some extent, and the difficulty of bonging the light-emitting structures on the substrate 100 may be reduced. As such, the yield of the backlight module may be improved, and the cost of the backlight module may be reduced.

In one embodiment, the first light-emitting structure, the second light-emitting structure, and the third light emitting structure may be used to emit red light, green light, and blue light, respectively. That is, the first light-emitting structure may be used to emit red light, the second light-emitting structure may be used to emit green light, and the third light-emitting structure may be used to emit blue light. In other embodiments, the first light-emitting structure may be used to emit red light, the second light-emitting structure may be used to emit blue light, and the third light-emitting structure may be used to emit green light; the first light-emitting structure may be used to emit green light, the second light-emitting structure may be used to emit blue light, and the third light-emitting structure may be used to emit red light; the first light-emitting structure may be used to emit green light, the second light-emitting structure may be used to emit red light, and the third light-emitting structure may be used to emit blue light; the first light-emitting structure may be used to emit blue light, the second light-emitting structure may be used to emit green light, and the third light-emitting structure may be used to emit red light; or the first light-emitting structure may be used to emit blue light, the second light-emitting structure may be used to emit red light, and the third light-emitting structure may be used to emit green light.

Figure 6:
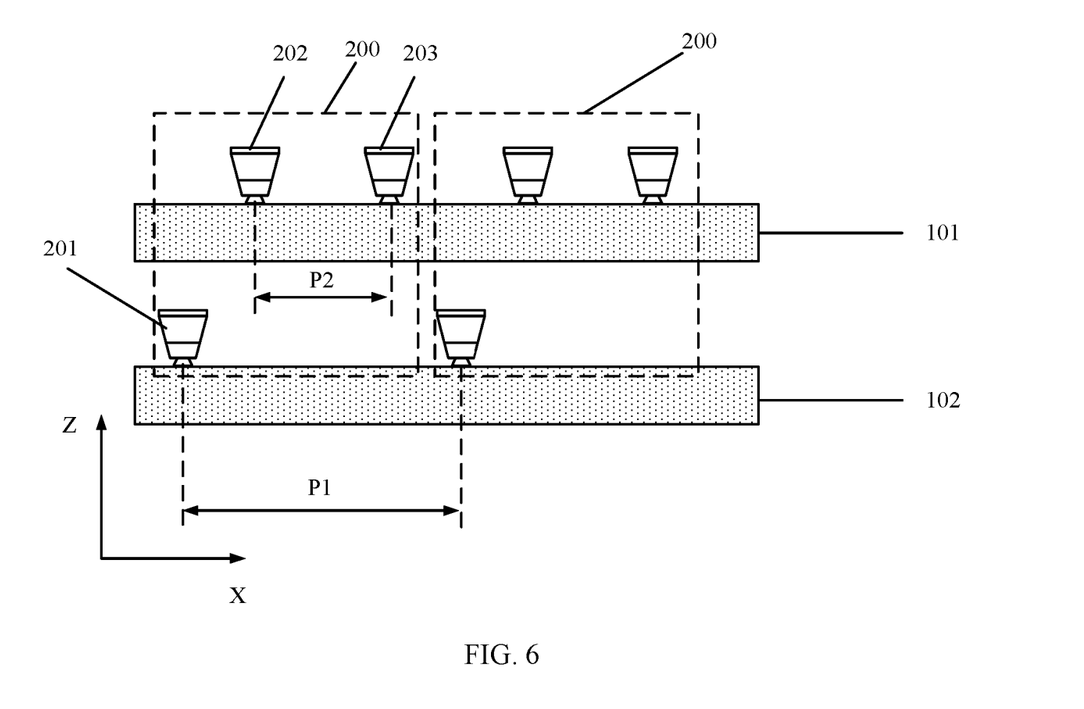

FIG. 6 illustrates a schematic cross-sectional view of the backlight module shown in FIG. 3 along the PP' line. Referring to FIG. 6, on the basis of the embodiments described above, in another embodiment, the number of the substrates 100 included in the backlight module may be two, namely, a first substrate 101 and a second substrate 102.

In one embodiment, the plurality of first light-emitting structures 201 and the plurality of second light-emitting structures 202 may be located on a same substrate, and the plurality of third light-emitting structures 203 may be located on another substrate. In other embodiments, the plurality of first light-emitting structures 201 and the plurality of third light-emitting structures 203 may be located on a same substrate, and the plurality of second light-emitting structures 202 may be located on another substrate, or the plurality of second light-emitting structures 202 and the plurality of third light-emitting structures 203 may be located on a same substrate, and the plurality of first light-emitting structures 201 may be located on another substrate.

In one embodiment, the backlight module shown in FIG. 6 may be taken as an example for illustration. In the backlight module, the plurality of second light-emitting structures 202 and the plurality of third light-emitting structures 203 may be disposed on a same substrate and the plurality of first light-emitting structures 201 may be disposed on the other substrate. For example, the plurality of first light-emitting structures 201 may be disposed on the second substrate 102, and the plurality of second light-emitting structures 202 and the plurality of third light-emitting structures 203 may be disposed on the first substrate 101. Alternatively, in other embodiments, the plurality of first light-emitting structures 201 may be disposed on the first substrate 101, and the plurality of second light-emitting structures 202 and the plurality of third light-emitting structures 203 may both be disposed on the second substrate 102. Similarly, the case where the plurality of first light-emitting structures 201 and the plurality of third light-emitting structures 203 are disposed on a same substrate and the plurality of second light-emitting structures 202 is disposed on the other substrate and the case where the plurality of first light-emitting structures 201 and the plurality of second light-emitting structures 202 are disposed on a same substrate and the plurality of third light-emitting structures 203 is disposed on the other substrate may each include two scenarios, and the detailed arrangement corresponding to each scenario is not described herein.

In an actual application process, in order to further reduce the difficulty of bonging the light-emitting structures on the substrate 100, on the first substrate 101, the orthogonal projection of the light-emitting structures that are located on the second substrate 102 may at least partially overlap with the light-emitting structures that are located on the first substrate 101.

Figure 7:
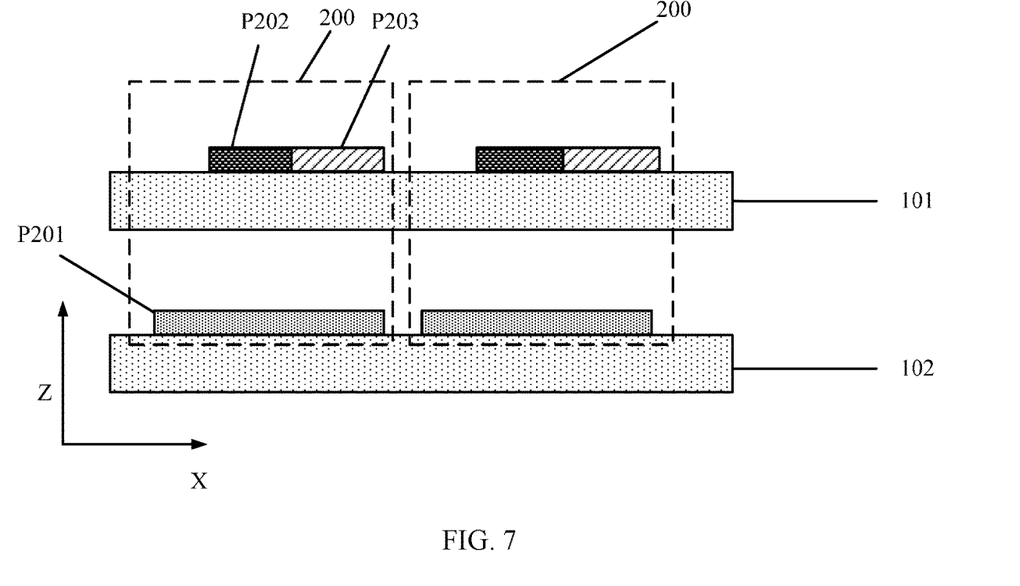

FIG. 7 illustrates a schematic cross-sectional view of the backlight module shown in FIG. 3 along the PP' line. In one embodiment, the backlight module shown in FIG. 7 may be taken as an example for illustration. In the backlight module, the plurality of first light-emitting structures 201 may be disposed on the second substrate 102, and the plurality of second light-emitting structures and the plurality of third light-emitting structures may be disposed on the first substrate 101. In FIG. 7, the distribution of the light-emitting surfaces of the first light-emitting structures 201, the second light-emitting structures 202, and the third light-emitting structures 203 is schematically illustrated. Referring to FIG. 7, the orthogonal projections of the light-emitting surface P202 of the second light-emitting structure 202 and the light-emitting surface P203 of the third light-emitting structure 203 on the first substrate 101 may partially overlap with the light-emitting surface P201 of the light-emitting structure (e.g., the first light-emitting structure 201) located on the first substrate. In order to prevent the light emitted by the light-emitting structures on the first substrate 101 from penetrating through the second light emitting-structures 202 and the third light emitting structures 203 and causing color mixing, two possible solutions may be provided in the following embodiments described below.

A first solution is to form the plurality of first light-emitting structures 201, the plurality of second light-emitting structures 202, and the plurality of third light-emitting structures 203 from an opaque light-emitting material, such that the light emitted by the light-emitting structures (e.g., the plurality of first light-emitting structures 201) on the lower substrate 100 (e.g., the second substrate 102) may be blocked.

Figure 8:
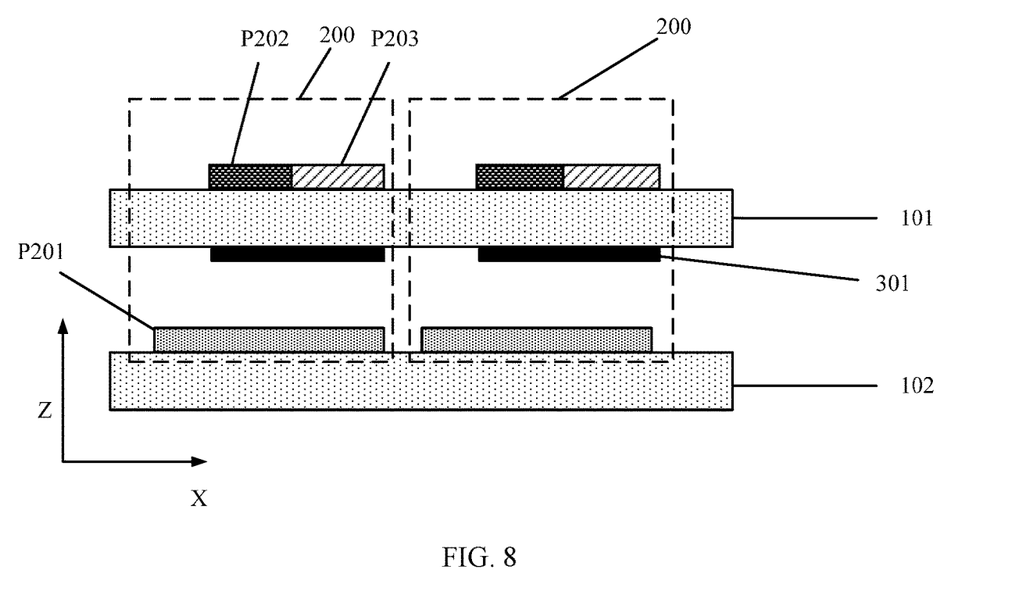

According to a second solution, a first light-shielding layer may be disposed. FIG. 8 illustrates a schematic cross-sectional view of the backlight module shown in FIG. 3 along the PP' line. Referring to FIG. 8, the backlight module may further include a first light-shielding layer 301 disposed between the first substrate 101 and the second substrate 102.

For example, in one embodiment, the first substrate 101 may be arranged to face the light-emitting surface of the light-emitting structures disposed on the second substrate 102. Further, the first light-shielding layer 301 may be located on the side of the first substrate 101 that faces to the second substrate 102. The orthogonal projection of the first light-shielding layer 301 on the first substrate 101 may cover the light-emitting structures disposed on the first substrate 101, such that the first light-shielding layer 301 may be used to block the light emitted from the light-emitting structures on the second substrate 102 toward the light-emitting structures disposed on the first substrate 101.

Figure 9:
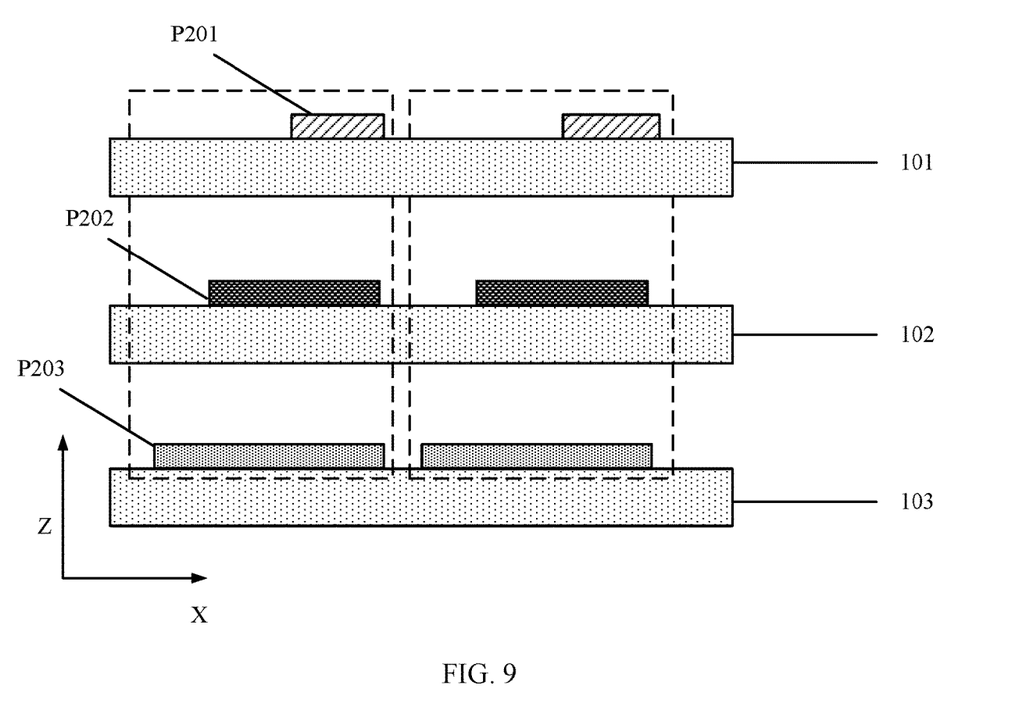

FIG. 9 illustrates a schematic cross-sectional view of the backlight module shown in FIG. 3 along the PP' line. Referring to FIG. 9, on the basis of the embodiments described above, in another embodiment, the number of substrates 100 included in the backlight module may be three, namely, a first substrate 101, a second substrate 102, and a third substrate 103.

The plurality of first light-emitting structures 201, the plurality of second light-emitting structures 202, and the plurality of third light-emitting structures 203 may be located on the first substrate 101, the second substrate 102, and the third substrate 103, respectively.

In one embodiment, the backlight module shown in FIG. 9 may be taken as an example for illustration. Referring to FIG. 9, in the backlight module, the second substrate 102 may be located on the light-emitting side of the light-emitting structures on the third substrate 103; the first substrate 101 may be located on the light-emitting side of the light-emitting structures on the second substrate 102; and the plurality of first light-emitting structures 201 may be disposed on the first substrate 101, the plurality of second light-emitting structures 202 may be disposed on the second substrate 102, and the plurality of third light-emitting structures 203 may be disposed on the third substrate 103.

In other embodiments, the plurality of first light-emitting structures 201 may be disposed on the second substrate 102 or on the third substrate 103. Similarly, the plurality of second light-emitting structures 02 may be disposed on the first substrate 101 or on the third substrate 103, and the plurality of third light-emitting structures 203 may be disposed on the first substrate 101 or on the second substrate 102. The distribution of the light-emitting structures on the three substrates may not be limited to any specific configuration, and may be determined according to actual need.

Similarly, in order to further reduce the difficulty of bonging the light-emitting structures on the substrate 100, on the second substrate 102, the orthogonal projection of the light-emitting structures that are located on the first substrate 101 may at least partially overlap with the light-emitting structures that are located on the second substrate 102. Also, on the third substrate 103, the orthogonal projection of the light-emitting structures that are located on the second substrate 102 may at least partially overlap with the light-emitting structures that are located on the third substrate 103.

In FIG. 9, the distribution of the light-emitting surfaces of the first light-emitting structure 201, the second light-emitting structure 202, and the third light-emitting structure 203 is schematically illustrated. Referring to FIG. 9, the orthogonal projection of the light-emitting surface P201 of the first light-emitting structure 201 on the second substrate 102 may partially overlap with the light-emitting surface P202 of the second light-emitting structure 202, and the orthogonal projection of the light-emitting surface P202 of the second light-emitting structure 202 on the third substrate 103 may partially overlap with the light-emitting surface P203 of the third light-emitting structure 203.

Similar to that described in the above embodiments, in order to prevent the light emitted by the light-emitting structures on a lower (along a reversed direction of Z axis) substrate from mixing with the light emitted by the light-emitting structures on an upper substrate and causing color mixing, two possible solutions may be adopted.

A first solution is to form the plurality of first light-emitting structures 201, the plurality of second light-emitting structures 202, and the plurality of third light-emitting structures 203 from an opaque light-emitting material, such that the light-emitting structures disposed on an upper substrate may be able to block the light emitted by the light-emitting structures disposed on a lower substrate 100.

Figure 10:
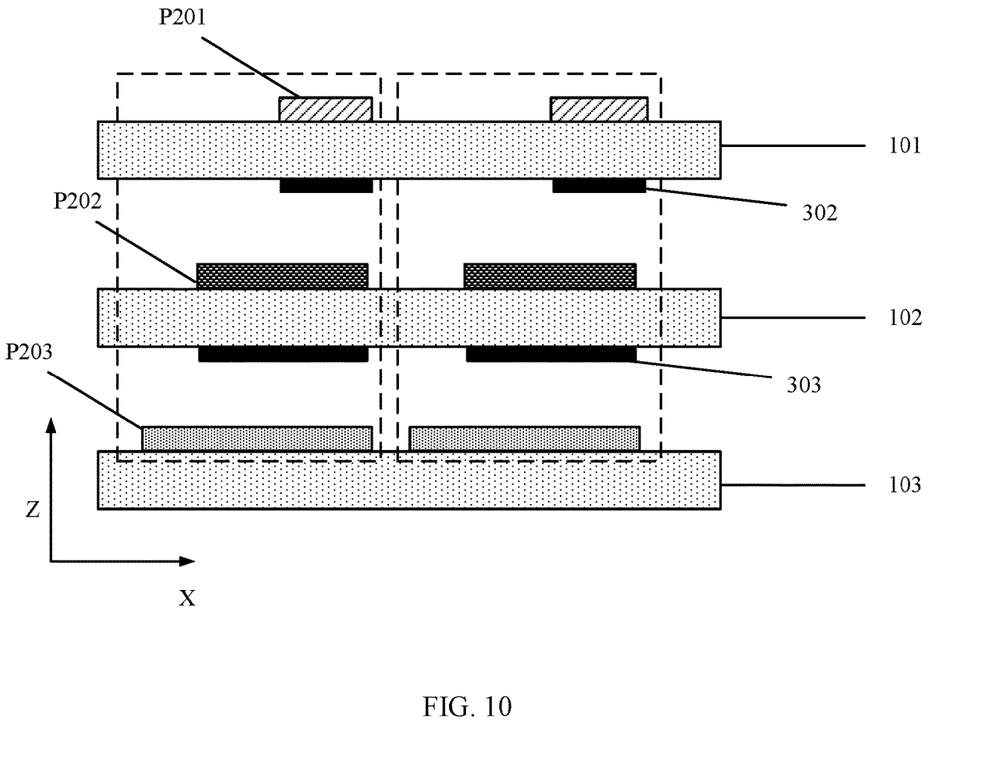

According to a second solution, a second light-shielding layer and a third light-shielding layer may be disposed. FIG. 10 illustrates a schematic cross-sectional view of the backlight module shown in FIG. 3 along the PP' line. Referring to FIG. 10, the backlight module may further include a second light-shielding layer 302 disposed between the first substrate 101 and the second substrate 102 and a third light-shielding layer 303 disposed between the second substrate 102 and the third substrate 103.

For example, in one embodiment, the second substrate 102 may be arranged to face the light-emitting surface of the light-emitting structures disposed on the third substrate 103, and the first substrate 101 may be arranged to face the light-emitting surface of the light-emitting structures that are disposed on the second substrate 102.

Further, the second light-shielding layer 302 may be located on the side of the first substrate 101 that faces to the second substrate 102. The orthogonal projection of the second light-shielding layer 302 on the first substrate 101 may cover the light-emitting structures disposed on the first substrate 101, such that the first light-shielding layer 301 may be used to block the light emitted from the light-emitting structures on the second substrate 102 toward the light-emitting structures disposed on the first substrate 101.

In addition, the third light-shielding layer 303 may be located on the side of the second substrate 102 that faces to the third substrate 103. The orthogonal projection of the third light-shielding layer 303 on the second substrate 102 may cover the light-emitting structures disposed on the second substrate 102, such that the third light-shielding layer 303 may be used to block the light emitted from the light-emitting structures on the third substrate 103 toward the light-emitting structures disposed on the second substrate 102.

Figure 11:
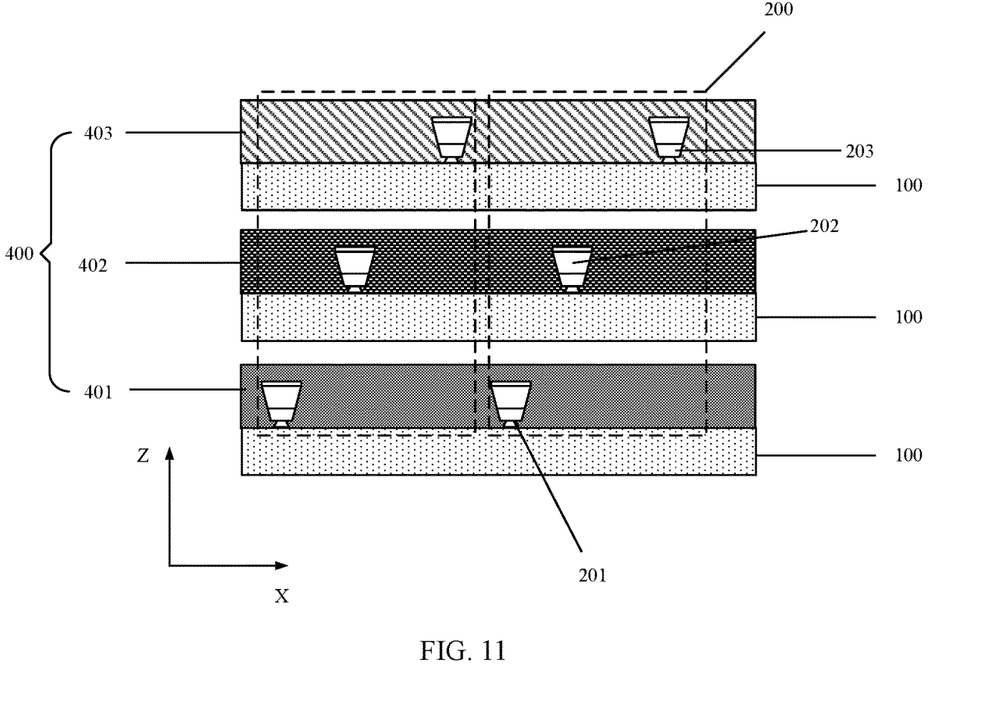

FIG. 11 illustrates a schematic cross-sectional view of the backlight module shown in FIG. 3 along the PP' line. Referring to FIG. 11, on the basis of the embodiments described above, in another embodiment, when the plurality of first light-emitting structures 201, the plurality of second light-emitting structures 202, and the plurality of light-emitting structures 203 emit light in a same color (e.g. red light), the backlight module may further include a fluorescent film layer 400 covering the first plurality of light-emitting structures 201, the plurality of second light-emitting structures 202, and the plurality of third light-emitting structures 203.

The fluorescent film layer 400 may be formed from three different types of fluorescent materials. For example, the fluorescent film layer 400 may be a red fluorescent material film layer 401, a green fluorescent material film layer 402, and a blue fluorescent material film layer 403. The red fluorescent material film layer 401 may cover the first plurality of light-emitting structures 201, the green fluorescent material film layer 402 may cover the plurality of second light-emitting structures 202, and the blue fluorescent material film layer 403 may cover the plurality of third light-emitting structures 203. Therefore, when the light emitted by the plurality of first light-emitting structures 201, the plurality of second light-emitting structures 202, and the plurality of third light-emitting structures 203 passes through these different types of fluorescent material film layers, red light, green light, and blue light may be respectively formed to realize the emission of the three primary colors of the backlight module.

Figure 12:
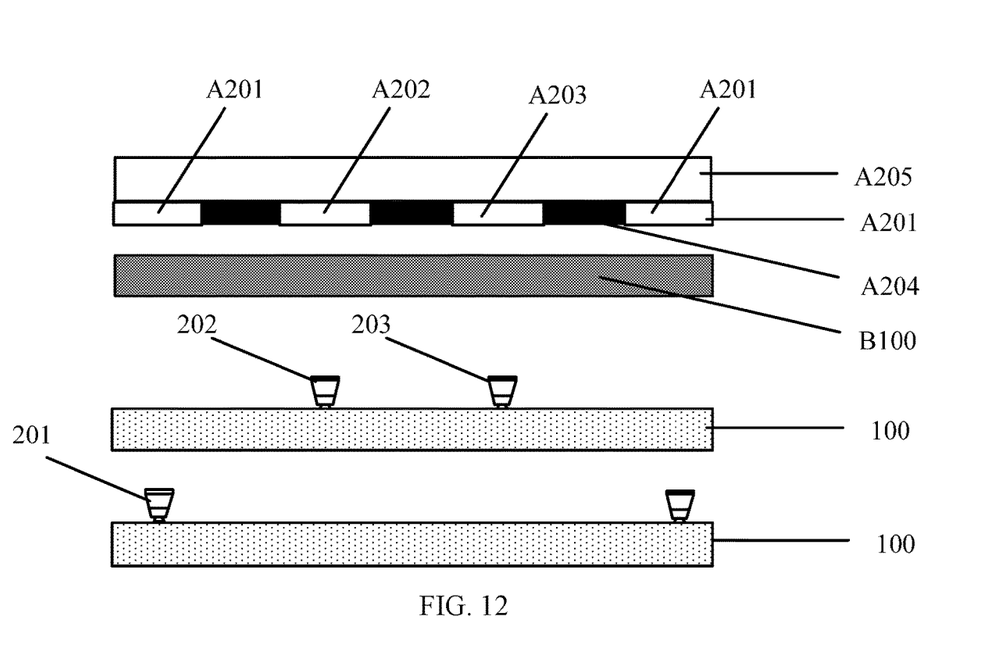
FIG. 12 illustrates a schematic cross-sectional view of an exemplary display module according to various embodiments of the present disclosure.

The present disclosure also provides a display module. FIG. 12 illustrates a schematic cross-sectional view of an exemplary display module according to various embodiments of the present disclosure. Referring to FIG. 12, the display module may include a display panel and a backlight module opposite to the display panel. The display panel may include an array substrate and a counter substrate. The array substrate may be located between the counter substrate and the backlight module. The backlight module may be a backlight module consistent with various embodiments of the present disclosure.

The backlight module shown in FIG. 12 may include two substrates 100, a plurality of first light-emitting structures 101, a plurality of second light-emitting structures 102, and a plurality of third light-emitting structures 103. FIG. 12 also illustrates an array substrate board B100 of the array substrate together with a counter substrate board A205, a black matrix A204, and a plurality of transparent color resists of the counter substrate. The plurality of transparent color resists may include a plurality of first transparent color resists A201, a plurality of second transparent color resists A202, and a plurality of third transparent color resists A203.

Referring to FIG. 12, because the backlight module is able to realize the emission light of three primary colors, the counter substrate may only need to define the positions of the light emission corresponding to each primary color. The counter substrate may include the black matrix A204 and the plurality of transparent color resists located in defined regions of the black matrix A204.

The light emitted by the plurality of first light-emitting structures 101, the plurality of second light-emitting structures 102, and the plurality of third light-emitting structures 103 may pass through the plurality of transparent color resists. For example, the light emitted by the plurality of first light-emitting structures 101 may pass through the plurality of first transparent color resists A201, the light emitted by the plurality of second light-emitting structures 102 may pass through the plurality of second transparent color resists A202, the light emitted by the plurality of third light-emitting structures 103 may pass through the plurality of third transparent color resists A203.

Figure 13:
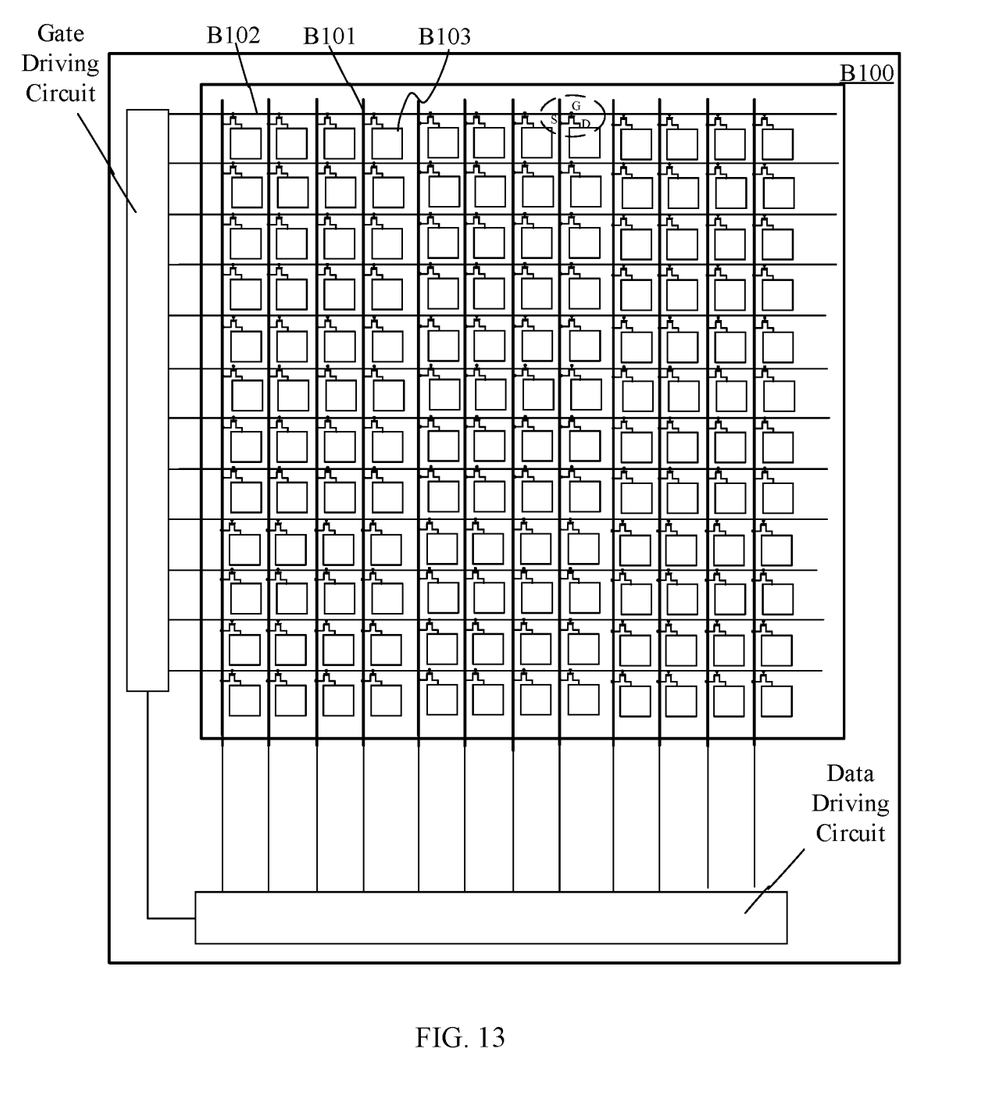
FIG. 13 illustrates a schematic top view of an exemplary array substrate according to various embodiments of the present disclosure.

FIG. 13 illustrates a schematic top view of an exemplary array substrate according to various embodiments of the present disclosure. To further illustrate the device structures of the array substrate, referring to FIG. 13, the array substrate may include an array substrate board B100, a plurality of data lines B101, and a plurality of gate lines B102. The plurality of data lines B101 and the plurality of gate lines B102 may be disposed across and insulated from each other. The array substrate may also include a plurality of display pixels B103 in the regions defined by the plurality of data lines B101 and the plurality of gate lines B102.

Further, the array substrate may also include a plurality of thin film transistors (TFTs) electrically connected to the plurality of data lines and the plurality of gate lines. The gate electrode G of each TFT may be electrically connected to a gate line B102, the source electrode S of the TFT may be electrically connected to a data line B101, and the drain electrode D of the TFT may be electrically connected to a corresponding pixel electrode.

The array substrate may further include a data driving circuit electrically connected to the plurality of data lines B101, and a gate driving circuit electrically connected to the plurality of gate lines B102.

The gate driving method for the array substrate shown in FIG. 13 may be a unilateral driving method. In other embodiments, the gate driving method for the array substrate may be a cross driving method or a bilateral driving method. The embodiments of the present disclosure are not intended to limit the method for driving the gates in the array substrate to any specific manner, and the selection of the gate driving method may be determined according to actual needs.

Referring to FIG. 12, the plurality of transparent color resists may include a plurality of first transparent color resists A201, a plurality of second transparent color resists A202, and a plurality of third transparent color resists A203. The plurality of first transparent color resists A201 may be arranged corresponding to the light emission regions of the plurality of first light-emitting structures 101, and may be used to transmit the light emitted by the plurality of first light-emitting structures 101. The plurality of second transparent color resists A202 may be arranged corresponding to the light emission regions of the plurality of second light-emitting structures 102, and may be used to transmit the light emitted by the plurality of second light-emitting structures 102. The plurality of third transparent color resists A203 may be arranged corresponding to the light emission regions of the plurality of third light-emitting structures 103, and may be used to transmit the light emitted by the plurality of third light-emitting structures 103.

According to various embodiments of the present disclosure, a backlight module and a display module are provided. In the disclosed backlight module, the plurality of first light-emitting structures, the second light-emitting structures, and the third light-emitting structures may be respectively disposed on at least two substrates that are arranged opposite to each other. Without increasing the surface dimension of the backlight module and reducing the number of the light-emitting structures in the backlight module, the pitch between the plurality of first light-emitting structures, the plurality of second light-emitting structures, and the plurality of third light-emitting structures that are disposed on the at least two substrates may be increased accordingly. Therefore, the difficulty of setting the light-emitting structures on the substrate may be reduced, the manufacturing yield of the backlight module may be improved, and the cost of the backlight module may be reduced.

It should be noted that the present disclosure also provides an electronic device. The electronic device may include a display module consistent with various embodiments of the present disclosure. The electronic device may be a cell phone, a tablet computer, a notebook computer, a monitor, or any other device having a display function.

The various embodiments in the present disclosure are described in a progressive manner, and each embodiment focuses on differences from other embodiments, and the same similar parts between the various embodiments may be referred to each other.

The above detailed descriptions only illustrate certain exemplary embodiments of the present disclosure, and are not intended to limit the scope of the present disclosure. Those skilled in the art can understand the specification as whole and technical features in the various embodiments can be combined into other embodiments understandable to those persons of ordinary skill in the art. Any equivalent or modification thereof, without departing from the spirit and principle of the present disclosure, falls within the true scope of the present disclosure.

What is claimed is:

1. A backlight module, comprising:
a plurality of light-emitting units arranged in an array, wherein:
each light-emitting unit includes a first light-emitting structure, a second light-emitting structure, and a third light-emitting structure, wherein:
the first light-emitting structure, the second light-emitting structure, and the third light-emitting structure are respectively disposed on at least two substrates that are arranged opposite to each other, the at least two substrates includes a first substrate and a second substrate, wherein the first substate faces a light-emitting surface of light-emitting structures disposed on the second substate; and
light emitted by the first light-emitting structure, light emitted by the second light-emitting structure, and light emitted by the third light-emitting structure are not mixed with each other; and
a first light-shielding layer disposed between the first substrate and the second substrate to block light emitted from the light-emitting structures disposed on the second substrate toward the light-emitting structures disposed on the first substrate.

2. The backlight module according to claim 1, wherein:
the at least two substrates include a total of two substrates, wherein:
the first light-emitting structure and the second light-emitting structure are disposed on a same substrate of the two substrates, and the third light-emitting structure is disposed on another substrate of the two substrates, or
the first light-emitting structure and the third light-emitting structure are disposed on a same substrate of the two substrates, and the second light-emitting structure is disposed on another substrate of the two substrates, or
the second light-emitting structure and the third light-emitting structure are disposed on a same substrate of the two substrates, and the first light-emitting structure is disposed on another substrate of the two substrates.

3. The backlight module according to claim 2, wherein:
the first light-emitting structure, the second light-emitting structure, and the third light-emitting structure are formed from an opaque light-emitting material.

4. A backlight module, comprising:
a plurality of light-emitting units arranged in an array, wherein:
each light-emitting unit includes a first light-emitting structure, a second light-emitting structure, and a third light-emitting structure, wherein:
the first light-emitting structure, the second light-emitting structure, and the third light-emitting structure are respectively disposed on at least two substrates that are arranged opposite to each other; and
light emitted by the first light-emitting structure, light emitted by the second light-emitting structure, and light emitted by the third light-emitting structure are not mixed with each other;

the at least two substrates include a total of two substrates; and the two substrates include a first substrate and a second substrate, wherein:
the first light-emitting structure and the second light-emitting structure are disposed on a same substrate of the two substrates, and the third light-emitting structure is disposed on another substrate of the two substrates, or the first light-emitting structure and the third light-emitting structure are disposed on a same substrate of the two substrates, and the second light-emitting structure is disposed on another substrate of the two substrates, or the second light-emitting structure and the third light-emitting structure are disposed on a same substrate of the two substrates, and the first light-emitting structure is disposed on another substrate of the two substrates;

a first light-shielding layer disposed between the first substrate and the second substrate, wherein:
the first substrate faces a light-emitting surface of light-emitting structures disposed on the second substrate;
the first light-shielding layer is located on a side of the first substrate facing to the second substrate;
an orthogonal projection of the first light-shielding layer on the first substrate is located on a side opposite the light-emitting structures disposed on the first substate, and the first light shielding layer covers an area corresponding to the light-emitting structures on the first substrate; and the first light-shielding layer is used to block light emitted from the light-emitting structures disposed on the second substrate toward the light-emitting structures disposed on the first substrate.

5. The backlight module according to claim 4, wherein:
on the first substrate, an orthogonal projection of the light-emitting structures disposed on the second substrate at least partially overlaps with the light-emitting structures disposed on the first substrate.

6. The backlight module according to claim 1, wherein:
the at least two substrates include a total of three substrates; and the three substrates include a first substrate, a second substrate, and a third substrate, wherein:
the second substrate is located between the first substrate and the second substrate,
the first light-emitting structure, the second light-emitting structure, and the third light-emitting structure are disposed on the first substrate, the second substrate, and the third substrate, respectively.

7. The backlight module according to claim 6, wherein:
the first light-emitting structure, the second light-emitting structure, and the third light-emitting structure are formed from an opaque light-emitting material.

8. The backlight module according to claim 6, further including:
a second light-shielding layer disposed between the first substrate and the second substrate; and
a third light-shielding layer disposed between the second substrate and the third substrate.

9. The backlight module according to claim 8, wherein:
the second substrate faces a light-emitting surface of light-emitting structures disposed on the third substrate;

the first substrate faces a light-emitting surface of light-emitting structures disposed on the second substrate;

the second light-shielding layer is located on a side of the first substrate facing to the second substrate, an orthogonal projection of the second light-shielding layer on the first substrate covers light-emitting structures disposed on the first substrate, and the second light-shielding layer is used to block light emitted from the light-emitting structures disposed on the second substrate toward the light-emitting structures disposed on the first substrate; and the third light-shielding layer is located on a side of the second substrate facing to the third substrate, an orthogonal projection of the third light-shielding layer on the second substrate covers the light-emitting structures disposed on the second substrate, and the third light-shielding layer is used to block light emitted from the light-emitting structures disposed on the third substrate toward the light-emitting structures disposed on the second substrate.

10. The backlight module according to claim 9, wherein:
on the second substrate, an orthogonal projection of the light-emitting structures disposed on the first substrate at least partially overlaps with the light-emitting structures disposed on the second substrate; and on the third substrate, an orthogonal projection of the light-emitting structures disposed on the second substrate at least partially overlaps with the light-emitting structures disposed on the third substrate.

11. The backlight module according to claim 1, further including:
a fluorescent film layer covering the first light-emitting structure, the second light-emitting structure, and the third light-emitting structure.

12. A display module, comprising:
a display panel and a backlight module opposite to the display panel, wherein:
the display panel includes an array substrate and a counter substrate arranged opposite to the array substrate, and the array substrate is located between the counter substrate and the backlight module; and
the backlight module includes:
a plurality of light-emitting units arranged in an array, wherein:
each light-emitting unit includes a first light-emitting structure, a second light-emitting structure, and a third light-emitting structure, wherein:
the first light-emitting structure, the second light-emitting structure, and the third light-emitting structure are respectively disposed on at least two substrates that are arranged opposite to each other, the at least two substrates includes a first substrate and a second substrate, wherein the first sub state faces a light-emitting surface of light-emitting structures disposed on the second sub state; and
light emitted by the first light-emitting structure, light emitted by the second light-emitting structure, and light emitted by the third light-emitting structure are not mixed with each other; and
a first light-shielding layer disposed between the first substrate and the second substrate to block light emitted from the light-emitting structures disposed on the second substrate toward the light-emitting structures disposed on the first substrate.

13. The display module according to claim 12, wherein:
the counter substrate includes a black matrix and a plurality of transparent color resists located in limited regions of the black matrix; and
the plurality of transparent color resists is used to transmit light emitted by a plurality of first light-emitting structures, a plurality of second light-emitting structures, and a plurality of third light-emitting structures.

14. The display module according to claim 13, wherein:
the plurality of transparent color resists includes a plurality of first transparent color resists, a plurality of second transparent color resists, and a plurality of third transparent color resists, wherein:
the first transparent color resist is arranged corresponding to light emission regions of the plurality of first light-emitting structures, and used to transmit the light emitted by the plurality of first light-emitting structures;
the second transparent color resist is arranged corresponding to light emission regions of the plurality of second light-emitting structures, and used to transmit the light emitted by the plurality of second light-emitting structures; and
the third transparent color resist is arranged corresponding to light emission regions of the plurality of third light-emitting structures, and used to transmit the light emitted by the plurality of third light-emitting structures.

15. The backlight module according to claim 12, wherein:
the at least two substrates include a total of two substrates, wherein:
the first light-emitting structure and the second light-emitting structure are disposed on a same substrate of the two substrates, and the third light-emitting structure is disposed on another substrate of the two substrates, or
the first light-emitting structure and the third light-emitting structure are disposed on a same substrate of the two substrates, and the second light-emitting structure is disposed on another substrate of the two substrates, or
the second light-emitting structure and the third light-emitting structure are disposed on a same substrate of the two substrates, and the first light-emitting structure is disposed on another substrate of the two substrates.

16. The backlight module according to claim 4, further including:
a fluorescent film layer covering the first light-emitting structure, the second light-emitting structure, and the third light-emitting structure.

\* \* \* \* \*